United States Patent
Kim et al.

(10) Patent No.: US 10,306,595 B2
(45) Date of Patent: May 28, 2019

(54) METHOD AND APPARATUS FOR SELECTING HOPPING TARGET CHANNELS

(71) Applicant: HANWHA AEROSPACE CO., LTD., Changwon-si, Gyeongsangnam-do (KR)

(72) Inventors: Jimin Kim, Suwon-si (KR); Kiyong Jeon, Seongnam-si (KR)

(73) Assignee: HANWHA AEROSPACE CO., LTD., Changwon-si (KR)

( * ) Notice: Subject to any disclaimer, the term of this patent is extended or adjusted under 35 U.S.C. 154(b) by 253 days.

(21) Appl. No.: 14/979,955

(22) Filed: Dec. 28, 2015

(65) Prior Publication Data
US 2016/0286565 A1 Sep. 29, 2016

(30) Foreign Application Priority Data
Mar. 27, 2015 (KR) .................. 10-2015-0043301

(51) Int. Cl.
*H04W 72/02* (2009.01)
*H04W 84/12* (2009.01)

(52) U.S. Cl.
CPC ............ *H04W 72/02* (2013.01); *H04W 84/12* (2013.01)

(58) Field of Classification Search
CPC ... H04W 76/025; H04W 88/06; H04W 88/10; H04W 84/12; H04W 72/02; H04W 16/14; H04W 84/18; H04W 72/085; H04W 24/08; H04W 72/1215; H04W 24/02; H04W 28/0236; H04W 52/245; H04W 72/0453; H04B 1/715; H04B 1/713; H04B 2001/7154; H04B 15/00; H04B 1/7136; H04B 17/318; H04B 1/7143; H04L 5/0012
See application file for complete search history.

(56) References Cited

U.S. PATENT DOCUMENTS

| | | |
|---|---|---|
| 7,079,568 B1 | 7/2006 | Boetzel et al. |
| 9,008,150 B2 | 4/2015 | Lee et al. |

(Continued)

FOREIGN PATENT DOCUMENTS

| | | |
|---|---|---|
| JP | 2003-501862 A | 1/2003 |
| JP | 2008172556 | * 7/2008 |

(Continued)

OTHER PUBLICATIONS

Hidesato et al., "Compound radio equipment and interference avoidance control method to be used therefor", Jul. 24, 2008, JP, JP 2008172556 ( English translation).*

(Continued)

*Primary Examiner* — Paul H Masur
*Assistant Examiner* — Michael K Phillips
(74) *Attorney, Agent, or Firm* — Sughrue Mion, PLLC

(57) ABSTRACT

A method of selecting hopping target channels by a device except a wireless local area network device includes: selecting candidate channels having a received signal strength less than a set threshold signal strength from among channels included in an available frequency band; classifying the candidate channels into frequency regions based on a channel frequency of each of the candidate channels; and for each of the frequency regions, selecting at least one candidate channel included in a frequency region as a hopping target channel for the frequency region.

13 Claims, 4 Drawing Sheets

(56) References Cited

U.S. PATENT DOCUMENTS

| | | | | |
|---|---|---|---|---|
| 2002/0175820 A1* | 11/2002 | Oja | ................... | G08B 21/0222 340/573.4 |
| 2006/0285579 A1* | 12/2006 | Rhee | ................... | H04B 1/7156 375/132 |
| 2009/0111496 A1* | 4/2009 | Ibrahim | .............. | H04W 72/085 455/512 |
| 2012/0076173 A1* | 3/2012 | Chang | .................. | H04B 1/7143 375/132 |
| 2013/0163642 A1* | 6/2013 | Kizu | ..................... | H04B 1/715 375/135 |
| 2013/0235905 A1* | 9/2013 | Serizawa | ............... | H04B 1/713 375/132 |
| 2013/0252553 A1* | 9/2013 | Hyon | ................... | H04W 16/14 455/41.2 |
| 2013/0308685 A1* | 11/2013 | Nagai | ................... | H04W 72/02 375/133 |
| 2014/0080427 A1* | 3/2014 | Babitch | ................. | H04B 15/04 455/78 |
| 2014/0348124 A1* | 11/2014 | Hasegawa | ............ | H04B 1/7143 370/330 |

FOREIGN PATENT DOCUMENTS

| | | |
|---|---|---|
| KR | 10-2012-0060016 A | 6/2012 |
| KR | 10-2012-0130110 A | 11/2012 |

OTHER PUBLICATIONS

FCC, "Modifications of Parts 2 and 15 of the Commission's Rules for unlicensed devices and equipment approval", FCC, Jul. 12, 2004, FCC-04-165.*

* cited by examiner

- Prior Art -

U = {3, 5, 9, 11, 21, 24, 27, 28, 31, 35, 38, 41, 45, 46, 47}

U1 = {3, 5, 9}
U2 = {11, 21, 24}
U3 = {27, 28, 31}
U4 = {35, 38, 41}
U5 = {45, 46, 47}

H = {CANDIDATE CHANNELS HAVING LOWEST
    VALUE OF RECEIVED SIGNAL STRENGTH}
 OR
H = {3, 11, 27, 35, 45}
 OR
H = {5, 21, 28, 38, 46}
 OR
H = {9, 24, 31, 41, 47}

METHOD AND APPARATUS FOR SELECTING HOPPING TARGET CHANNELS

CROSS-REFERENCE TO THE RELATED APPLICATION

This application claims priority from Korean Patent Application No. 10-2015-0043301, filed on Mar. 27, 2015, in the Korean Intellectual Property Office, the disclosure of which is incorporated herein in its entirety by reference.

BACKGROUND

1. Field

Apparatuses and methods consistent with exemplary embodiments relate to selecting hopping target channels for a device which is disposed in a network such as a wireless local area network (WLAN) but does not use the network.

2. Description of the Related Art

In a WLAN, a WLAN device may preferentially use a frequency band of the WLAN. Therefore, according to a wireless communication protocol, a device which is not a WLAN device (hereinafter referred to as "non-WLAN device") should hop a frequency channel periodically while using a frequency band of a WLAN. For example, a non-WLAN device should hop 15 frequency channels or more at a period of 0.4 second in a WLAN.

Hereinafter, a channel denotes a frequency band having a predetermined channel width (or bandwidth) to be used. For a WLAN device, a wireless fidelity (Wi-Fi) device using this WLAN may be exemplarily used. For a non-WLAN device, a network monitor camera which does not use this WLAN may be exemplarily used.

FIG. 1 shows channels that may be used by a WLAN device in a frequency band of Institute of Electrical and Electronics Engineers (IEEE) 802.11b standard. 13 channels may be used in South Korea as illustrated in FIGS. 1, and 11 channels may be used in the United States.

Referring to FIG. 1, an available frequency band for WLAN devices ranges from about 2.4 to 2.4835 GHz, and a channel width thereof is about 83.5 MHz. Therefore, if a channel width applied to a non-WLAN device included in a WLAN of 83.5 MHz is about 1 MHz, the non-WLAN device may use 83 channels at maximum. In this case, the non-WLAN device should hop frequency channels periodically while using 15 frequency channels or more.

However, in the same frequency band of 83.5 MHz, a channel interval between channels available to a WLAN device is about 5 MHz, and a width of each channel is about 22 MHz, which is considerably wide. Therefore, in the case where a WLAN device is newly added or a non-operating WLAN device operates again while a non-WLAN device communicates with an external apparatus in this 83.5 MHz frequency band, there is a high probability that a frequency channel used by the non-WLAN device is interfered. That is, there is a high probability that communication of the non-WLAN device does not function temporarily.

SUMMARY

The exemplary embodiments of the inventive concept provide a method of selecting hopping target channels at a device which is included in a network such as a wireless local area network (WLAN) but does not use the network in order to minimize a probability that communication of the device does not function temporarily, and an apparatus to perform the method.

Various aspects of the exemplary embodiments will be set forth in part in the description which follows and, in part, will be apparent from the description, or may be learned by practice of the presented embodiments.

According to an exemplary embodiment, there is provided a method of selecting hopping target channels for a device which is included in a network but does not use the network. The method may include: selecting a plurality of candidate channels from among a plurality of channels included in an available frequency band of the network; classifying the candidate channels into a plurality of frequency regions based on a channel frequency of each of the candidate channels; and selecting at least one candidate channel as a hopping target channel from each of the frequency regions. Here, the network may be a WLAN, and the device which included in the network but does not use the network may be a monitoring or surveillance camera.

The available frequency band may be a frequency band of the WLAN.

The available frequency band may be a band ranging from about 2.4 to about 2.4835 GHz for the WLAN.

Each of the candidate channels may have a received signal strength less than a threshold signal strength.

The candidate channels may include channels which are reselected after the threshold signal strength is increased from a previous threshold signal strength in response to a number of candidate channels, each having a received signal strength, is less than a predetermined number of channels.

The hopping target channel selected from each of the frequency regions may include a channel having a lowest received signal strength in each of the frequency regions.

The classifying the candidate channels may include: sorting the candidate channels in ascending order or descending order according to the channel frequency of each of the candidate channels; and classifying the candidate channels such that at least one candidate channel included in each of the frequency regions is sorted in ascending order or descending order.

The hopping target channel selected from each of the frequency regions may include a channel having a lowest, intermediate, or highest frequency in each of the frequency regions.

The hopping target channels may include two most frequency-distant channels selected from two subsequent frequency regions among the frequency regions.

According to another exemplary embodiment, there is provided a channel-selecting apparatus for a device which is included in a network but does not use the network. The apparatus may include: at least one processor configured to implement: a candidate channel selector which determines a plurality of available channels available in the network; and a target channel selector which selects a plurality of frequency hopping channels from among the available channels such that any two of the selected frequency hopping channels are separated by a predetermined frequency difference or more.

According to still another exemplary embodiment, there is provided another channel-selecting apparatus for a device which is included in a network but does not use the network. The apparatus may include: at least one processor configured to implement: a candidate channel selector which selects a plurality of candidate channels from among a plurality of channels included in an available frequency band of the network; a candidate channel classifier which classifies the candidate channels into a plurality of frequency regions based on a channel frequency of each of the candidate channels; and an target channel selector which selects at least one candidate channel as a hopping target channel from each of the frequency regions.

The available frequency band may be a frequency band of a WLAN and the device may be a monitoring camera or a surveillance camera.

The available frequency band may be a band ranging from about 2.4 to about 2.4835 GHz for the WLAN.

The candidate channel selector may select each of the candidate channels which has a received signal strength less than a threshold signal strength.

The candidate channels may be channels which are reselected by the candidate channel selector after the threshold signal strength is increased from a previous threshold signal strength in response to a number of candidate channels, each having a received signal strength, is less than a predetermined number of channels.

The hopping target channel selected by the target channel selector from each of the frequency regions may be a channel having a lowest received signal strength in each of the frequency regions.

The processor may further implement: a sorting unit which sorts the candidate channels in ascending order or descending order according to the channel frequency of each of the candidate channels, wherein the candidate channel classifier classifies the candidate channels such that at least one candidate channel included in each of the frequency regions is sorted in ascending order or descending order.

The hopping target channel selected by the target channel selector from each of the frequency regions may be a channel having a lowest, intermediate, or highest frequency in each of the frequency regions.

The hopping target channels may include two most frequency-distant channels selected from two subsequent frequency regions among the frequency regions.

The apparatus may be included in the device.

According to a method and an apparatus for selecting hopping object channels in accordance with exemplary embodiments, the candidate channels having a received signal strength less than the threshold signal strength are selected first. Therefore, the candidate channels selected first have a low probability of being interfered compared with other channels.

Also, the candidate channels are classified for each frequency region depending on a channel frequency, and one candidate channel is selected as a hopping target channel for the each frequency region. Therefore, the candidate channels may maintain a maximum frequency interval or frequency difference. In the case where a WLAN device newly or additionally operates while a non-WLAN device communicates with an external apparatus, a probability that the hopping target channels used by the non-WLAN device are interfered may be reduced. That is, a probability that communication of the non-WLAN device does not work may be reduced.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION OF THE EXEMPLARY EMBODIMENTS

The following description of exemplary embodiments along with accompanying drawings are provided for understanding the inventive concept, and portions easily implemented by those of ordinary skill in the art may be omitted.

Also, the present specification and the accompanying drawings are not provided for the purpose of limitation. Terms used in the present specification should be construed as meaning and concept that match the technical spirit of the inventive concept to most properly express the inventive concept.

Hereinafter, the inventive concept will be described more fully with reference to the accompanying drawings, in which exemplary embodiments of the inventive concept are shown.

Figure 1:
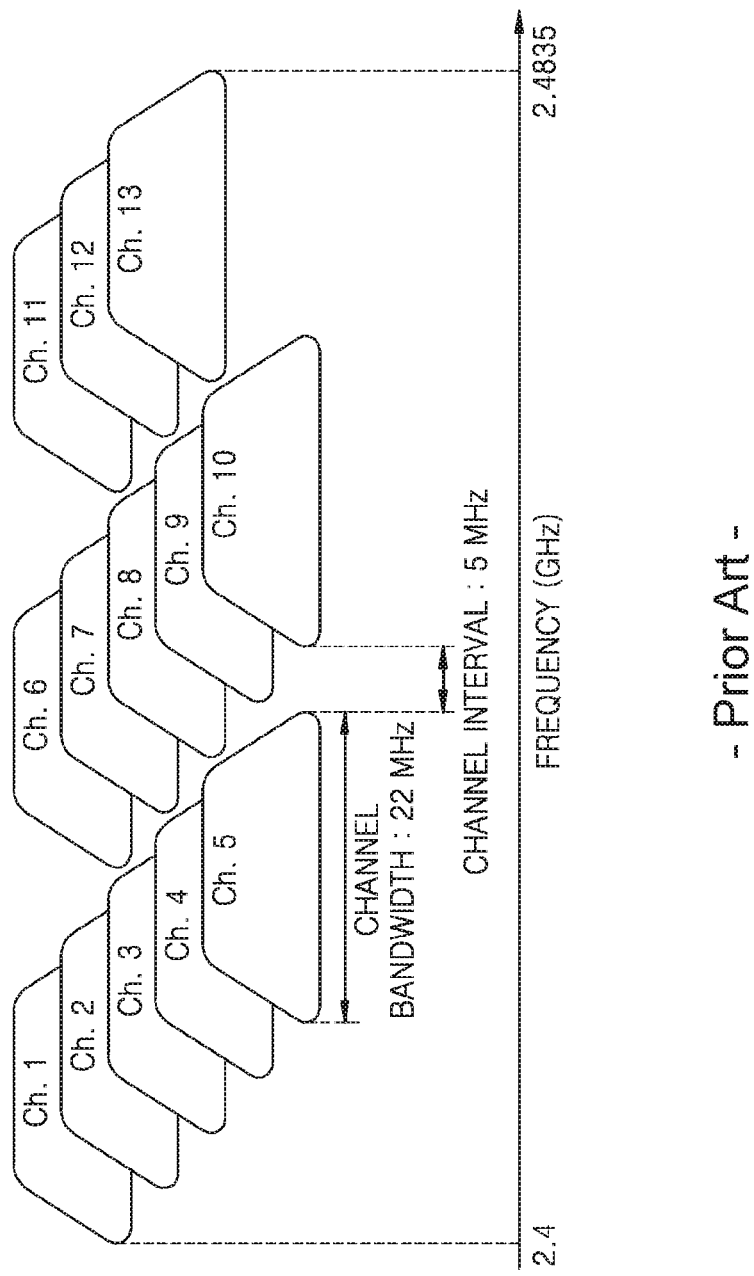
FIG. 1 is a diagram illustrating channels that may be used by a wireless local area network (WLAN) device in a frequency band of Institute of Electrical and Electronics Engineers (IEEE) 802.11b standard.
Figure 2:
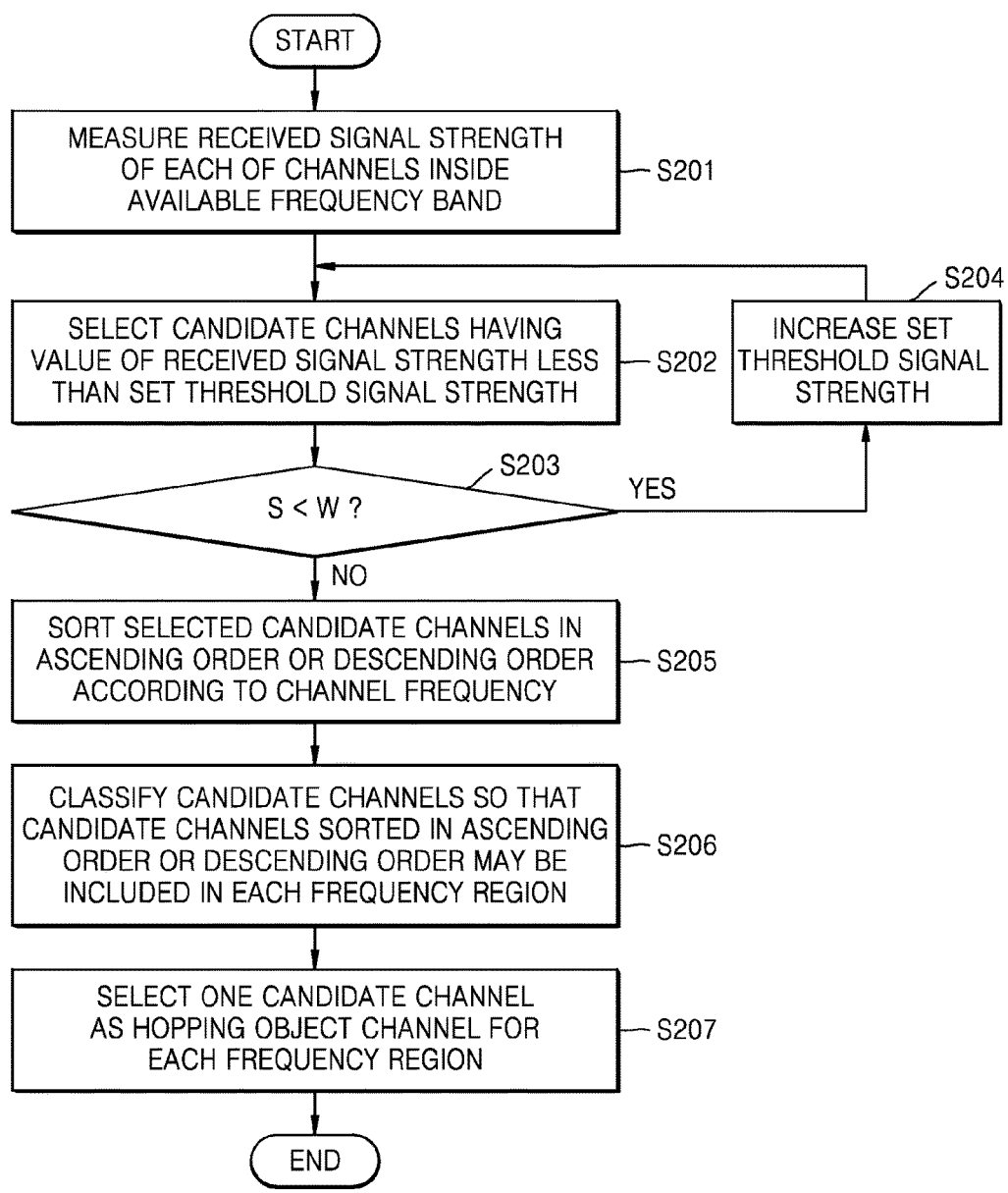
FIG. 2 is a flowchart illustrating a method of selecting hopping object channels at a device except a WLAN device, according to an exemplary embodiment.

FIG. 2 shows a method of selecting hopping target channels in a wireless local area network (WLAN) for a device which is not a WLAN device, according to an exemplary embodiment. The non-WLAN device may be, for example, a monitoring camera that performs wireless communication with a server device or a client terminal.

Figure 3:
FIG. 3 is a view for explaining operations S205 to S207 of FIG. 2 by using an example.
Figure 3:

FIG. 3 is a view for explaining operations S205 to S207 of FIG. 2 by using an example. U in FIG. 3 denotes a set of candidate channels sorted in an ascending order. U1 to U5 denote sets of candidate channels included in each frequency region. Also, H denotes a set of hopping target channels. Here, the channel denotes a frequency band. However, the channel may indicate a single frequency according to an exemplary embodiment.

A method of selecting hopping target channels H is described below with reference to FIGS. 2 and 3.

In operations S201 to S204, a non-WLAN device selects candidate channels having a received signal strength less than a threshold signal strength from among a plurality of channels within an available frequency band. Here, the received signal strength represents a strength of a reception signal measured at the non-WLAN device in each of the plurality of channels. The available frequency band may be a frequency band of a WLAN. For example, the available frequency band may range from about 2.4 to 2.4835 GHz.

In more detail, the non-WLAN device measures a received signal strength with respect to each of channels included in the available frequency band (operation S201).

Subsequently, the non-WLAN device selects candidate channels having a received signal strength less than the threshold signal strength (operation S202).

In this case, when the number S of candidate channels is less than a predetermined number W of channels (operation S203), the non-WLAN device increases the threshold signal strength (S204).

As described above, the candidate channels selected first according to operations S201 to S204 may have a low probability of being interfered compared with other channels.

In operations S205 and S206, the non-WLAN device classifies the candidate channels into a plurality of frequency regions U1 to U5 based on a channel frequency of each of the candidate channels.

Subsequently, the non-WLAN device sorts the candidate channels in ascending order or descending order according to a channel frequency (operation S205). As illustrated in FIG. 3, a set U of candidate channels may be sorted in an ascending order. For example, a channel "3" of a lowest frequency in the set U of the candidate channels may be a first candidate channel, and a channel "47" of a highest frequency in the set U of the candidate channels may be a last candidate channel.

Next, the non-WLAN device classifies the candidate channels in order such that the candidate channels sorted in ascending order or descending order may be included in each of the frequency regions U1 to U5 (operation S206). For example, the channel "3" of the lowest frequency in the set U of the candidate channels may be classified such that the channel "3" may be included in the first frequency region U1, and the channel "47" of the highest frequency in the set U of the candidate channels may be classified such that the channel "47" may be included in the fifth frequency region U5.

The non-WLAN device selects at least one candidate channel as a hopping target channel from each of the frequency regions U1 to U5, thereby forming a set H of hopping target channels (operation S207).

As described above, the candidate channels selected from the frequency regions U1 to U5, respectively, may maintain a maximum frequency interval or frequency difference according to operations S205 to S207. Therefore, in the case where a WLAN device newly or additionally operates while the non-WLAN device communicates with an external apparatus, a probability that the hopping target channels used by the non-WLAN device are interfered may be reduced. That is, a probability that communication of the non-WLAN device does not function temporarily may be reduced.

According to an exemplary embodiment, in setting a set of hopping target channels H according to operation S207, a candidate channel having a lowest value of a received signal strength may be selected as a hopping target channel from each of the frequency regions U1 to U5. Accordingly, a probability that the hopping target channels used by the non-WLAN device are interfered may be reduced even more.

According to another exemplary embodiment, a candidate channel of the lowest frequency in each of the frequency regions U1 to U5 may be selected as the hopping target channels. In this case, a set of the hopping target channels H in FIG. 3 is {3, 11, 27, 35, 45}.

According to still another exemplary embodiment, a candidate channel of an intermediate frequency in each of the frequency regions U1 to U5 may be selected as the hopping target channels. In this case, a set of the hopping target channels H in FIG. 3 is {5, 21, 28, 38, 46}.

According to yet another exemplary embodiment, a candidate channel of the highest frequency in each of the frequency regions U1 to U5 may be selected as the hopping target channels. In this case, a set of the hopping target channels H in FIG. 3 is {9, 24, 31, 41, 47}.

The inventive concept of selecting the hopping target channels is not limited to the above exemplary embodiments. For example, the hopping target channels may be selected such that two most frequency-distant channels from two subsequent or neighboring frequency regions among the frequency regions U1 to U5 are selected as two of the hopping target channels. Also, without classifying the plurality of channels within the available frequency band into the frequency regions U1 to U5 as above, the hopping target channels may be selected from among the plurality of channels such that any two subsequent or neighboring candidate channels are separated by a predetermined frequency difference or more.

Figure 4:
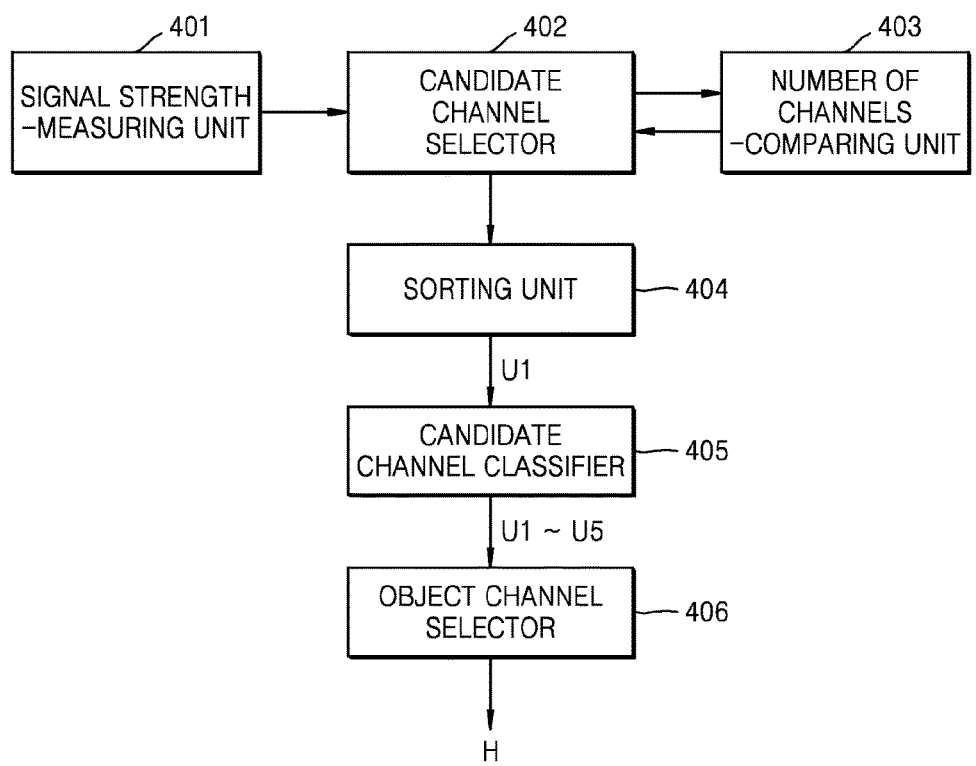
FIG. 4 is a block diagram illustrating a channel-selecting apparatus, according to an exemplary embodiment.

FIG. 4 shows a channel-selecting apparatus which may be included in a non-WLAN device and selecting hopping target channels, according to an exemplary embodiment. The channel-selecting apparatus may be implemented independently from the non-WLAN device. A channel-selecting apparatus according to an exemplary embodiment is described with reference to FIGS. 3 and 4.

The channel-selecting apparatus according to an exemplary embodiment includes a signal strength-measuring unit 401, a candidate channel selector 402, a number of channels-comparing unit 403, a sorting unit 404, a candidate channel classifier 405, and an target channel selector 406.

The signal strength-measuring unit 401 measures a received signal strength of each of channels within an available frequency band of a WLAN.

The candidate channel selector 402 selects candidate channels having a value of a received signal strength less than a threshold signal strength from the channels within the available frequency band, according to a measurement result from the signal strength-measuring unit 401. Therefore, the candidate channels selected first by the candidate channel selector 402 may have a low probability of being interfered compared with other channels.

In this case, the channels-comparing unit 403 determines whether the number of candidate channels selected by the candidate channel selector 402 is less than a predetermined number of channels. When the number of candidate channels is less than the predetermined number of channels, the candidate channel selector 402 increases the threshold signal strength.

The sorting unit 404 sorts the candidate channels in ascending order or descending order according to a channel frequency. As illustrated in FIG. 3, the set U of candidate channels may be sorted in ascending order. For example, the sorting unit 404 may sort the channel "3" of the lowest frequency in the set U of the candidate channels first, and sort the channel "47" of the highest frequency last.

The candidate channel classifier 405 classifies the candidate channels in order such that the candidate channels sorted in ascending order or descending order may be included in each of the frequency regions U1 to U5. For example, the candidate channel classifier 405 may classify the channel "3" of the lowest frequency in the set U of the candidate channels such that the channel "3" may be included in the first frequency region U1, and may classify the channel "47" of the highest frequency in the set U of the candidate channels such that the channel "47" may be included in the fifth frequency region U5.

The target channel selector 406 selects at least one candidate channel as a hopping target channel from each of the frequency regions U1 to U5, thereby forming a set H of hopping target channels. Therefore, the hopping target channels selected by the target channel selector 406 may maintain a maximum frequency interval or frequency difference. Therefore, in the case where a WLAN device newly or additionally operates while a non-WLAN device communicates with an external apparatus, a probability that the hopping target channels used by the non-WLAN device are interfered may be reduced. That is, a probability that communication of the non-WLAN device does not function temporarily may be reduced.

In setting a set H of hopping target channels, the target channel selector 406 according to an exemplary embodiment may select candidate channels having a lowest value of a received signal strength from the frequency regions U1 to U5, respectively, as the hopping target channels. An target channel selector 406 according to another exemplary embodiment may select channels of the lowest frequency from the frequency regions U1 to U5, respectively, as the hopping target channels. In this case, a set of the hopping target channels H in FIG. 3 is {3, 11, 27, 35, 45}.

An target channel selector 406 according to still another exemplary embodiment may select channels of an intermediate frequency from the frequency regions U1 to U5, respectively, as the hopping target channels. In this case, a set of the hopping target channels H in FIG. 3 is {5, 21, 28, 38, 46}.

An target channel selector 406 according to further another exemplary embodiment may select channels of the highest frequency from the frequency regions U1 to U5, respectively, as the hopping target channels. In this case, a set of the hopping target channels H in FIG. 3 is {9, 24, 31, 41, 47}.

Further, the target channel selector 406 may select the hopping target channels such that two most frequency-distant channels from two subsequent or neighboring frequency regions among the frequency regions U1 to U5 are selected as two of the hopping target channels.

As described above, according to a method and an apparatus for selecting hopping target channels in accordance with exemplary embodiments, candidate channels having a value of a received signal strength less than a threshold signal strength are selected first. The candidate channels selected first have a low probability of being interfered compared with other channels.

Also, the candidate channels are classified into each frequency region depending on a channel frequency, and one candidate channel is selected as a hopping target channel from the each frequency region. Therefore, the hopping target channels may maintain a maximum frequency interval or difference. In the case where a WLAN device newly or additionally operates while a non-WLAN device communicates with an external apparatus, a probability that the hopping target channels used by the non-WLAN device are interfered may be reduced. That is, a probability that communication of the non-WLAN device does not function temporarily may be reduced.

The exemplary embodiments described above do not limit the inventive concept thereto. For example, the channel-selecting apparatus of FIG. 4 may not include the candidate channel classifier 405 which is configured to classify the plurality of channels within the available frequency band into the frequency regions U1 to U5 as above. In this case, the candidate channel selector 402 may determine the available frequency band of the WLAN and the plurality of channels within the available frequency band, and the target channel selector 406 may select the hopping target channels from among the plurality of channels such that any two subsequent or neighboring candidate channels are separated by a predetermined frequency difference or more.

The exemplary embodiments including the above-described methods or operations may be embodied in the form of computer programs executable through various components on a computer, and the computer program may be recorded on a non-transitory computer-readable recording medium. In this case, examples of the non-transitory computer-readable recording medium include magnetic recording media such as hard disks, floppy disks, and magnetic tapes, optical recording media such as compact disc (CD)-read-only memories (ROMs) and digital versatile discs (DVDs), magneto-optical recording media such as floptical disks, and hardware devices such as ROMs, random-access memories (RAMs), and flash memories that are especially configured to store and execute program commands. Furthermore, the non-transitory computer-readable recording medium may include an intangible medium embodied in a transmittable form on a network, and may be, for example, a medium embodied in the form of software or an application and transmittable and distributable via a network.

Meanwhile, the computer programs may be those that are especially designed and configured for the inventive concept, or may be those that are known and available to computer programmers skilled in the art. Examples of the computer programs include machine language codes that may be generated by a compiler, and high-level language codes that may be executed by a computer by using an interpreter.

At least one of the components, elements, modules or units represented by a block as illustrated in FIG. 4 may be embodied as various numbers of hardware, software and/or firmware structures that execute respective functions described above, according to an exemplary embodiment. For example, at least one of these components, elements, modules or units may use a direct circuit structure, such as a memory, processing, logic, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. At least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

While this inventive concept has been particularly shown and described with reference to exemplary embodiments thereof, it will be understood by those skilled in the art that various changes in form and details may be made therein without departing from the spirit and scope of the inventive concept as defined by the appended claims. For example, the inventive concept is not limited to only a WLAN and a non-WLAN device operating in the WLAN, and instead, the inventive concept may apply to a different network and a device which is disposed in this network but does not or is not allowed to use this network.

The exemplary embodiments should be considered in descriptive sense only and not for purposes of limitation. Therefore, the scope of the inventive concept is defined not by the detailed description of the inventive concept but by the appended claims, and all differences within the scope will be construed as being included in the inventive concept.

What is claimed is:

1. A method of selecting hopping target channels for a device which is included in a network but does not use the network, the method comprising:

selecting a plurality of candidate channels from among a plurality of channels included in an available frequency band of the network, in response to a reception signal strength of the plurality of candidate channels being less than a threshold signal strength;

in response to a number of the plurality of candidate channels being less than a predetermined number of channels, increasing the threshold signal strength and repeating the selection of the plurality of candidate channels until the number of the plurality of candidate channels is equal to the predetermined number of channels;

classifying the plurality of candidate channels into a plurality of frequency regions by grouping adjacent two or more of the plurality of candidate channels into a same frequency region of the plurality of frequency regions and arranging the adjacent two or more candidate channels of the same frequency region in order of frequency of the adjacent two or more candidate channels; and selecting at least one candidate channel as a hopping target channel from each of the plurality of frequency regions, wherein the at least one candidate channel selected from each of the plurality of frequency regions has a same relative position in the respective plurality of frequency regions, wherein the classifying the plurality of candidate channels comprises: arranging the adjacent two or more candidate channels in descending order of frequency of the adjacent two or more candidate channels.

2. The method of claim 1, wherein the available frequency band comprises a frequency band of a wireless local area network.

3. The method of claim 1, wherein the hopping target channel selected from each of the plurality of frequency regions comprises the channel having a lowest received signal strength in each of the plurality of frequency regions.

4. The method of claim 1, wherein the classifying the plurality of candidate channels comprises:

arranging the adjacent two or more candidate channels in ascending order of frequency of the adjacent two or more candidate channels.

5. The method of claim 1, wherein the hopping target channel selected from each of the plurality of frequency regions comprises a channel having a lowest, intermediate, or highest frequency in each of the plurality of frequency regions.

6. A method of selecting hopping target channels for a device which is included in a network but does not use the network, the method comprising:

selecting a plurality of candidate channels from among a plurality of channels included in an available frequency hand of the network, in response to a reception signal strength of the plurality of candidate channels being less than a threshold signal strength;

in response to a number of the plurality of candidate channels being less than a predetermined number of channels, increasing the threshold signal strength and repeating the selection of the plurality of candidate channels until the number of the plurality of candidate channels is equal to the predetermined number of channels;

classifying the plurality of candidate channels into a plurality of frequency regions by grouping adjacent two or more of the plurality of candidate channels into a same frequency region of the plurality of frequency regions and arranging the adjacent two or more candidate channels of the same frequency region in order of frequency of the adjacent two or more candidate channels; and selecting at least one candidate channel as a hopping target channel from each of the plurality of frequency regions, wherein the at least one candidate channel selected from each of the plurality of frequency regions has a same relative position in the respective plurality of frequency regions, wherein the hopping target channels comprise two most frequency-distant channels selected from two neighboring frequency regions among the plurality of frequency regions.

7. A channel-selecting apparatus for a device which is included in a network but does not use the network, the apparatus comprising:

at least one processor configured to implement:
  a candidate channel selector that
    selects a plurality of candidate channels from among a plurality of channels included in an available frequency band of the network, in response to a reception signal strength of the plurality of candidate channels being less than a threshold signal strength, and
    in response to a number of the plurality of candidate channels being less than a predetermined number of channels, increases the threshold signal strength and repeats the selection of the plurality of candidate channels until the number of the plurality of candidate channels is equal to the predetermined number of channels;
  a candidate channel classifier which classifies the plurality of candidate channels into a plurality of frequency regions by grouping adjacent two or more of the plurality of candidate channels into a same frequency region of the plurality of frequency regions and arranging the adjacent two or more candidate channels of the same frequency region in order of frequency of the adjacent two or more candidate channels; and
  an target channel selector which selects at least one candidate channel as a hopping target channel from each of the plurality of frequency regions, wherein the at least one candidate channel selected from each of the plurality of frequency regions has a same relative position in the respective plurality of frequency regions, wherein the processor is further configured to implement:
  a sorting unit which arranges the adjacent two or more candidate channels in descending order of frequency of the adjacent two or more candidate channels.

8. The apparatus of claim 7, wherein the available frequency band comprises a frequency band of a wireless local area network.

9. The apparatus of claim 7, wherein the hopping target channel selected by the target channel selector from each of the plurality of frequency regions comprises the channel having a lowest received signal strength in each of the plurality of frequency regions.

10. The apparatus of claim 7, wherein the processor is further configured to implement a sorting unit which arranges the adjacent two or more candidate channels in ascending order of frequency of the adjacent two or more candidate channels.

11. The apparatus of claim 7, wherein the hopping target channel selected by the target channel selector from each of the plurality of frequency regions comprises a channel having a lowest, intermediate, or highest frequency in each of the plurality of frequency regions.

12. The apparatus of claim 7, wherein the network is a wireless local area network, and the device comprises a monitoring camera.

13. A channel-selecting apparatus for a device which is included in a network but does not use the network, the apparatus comprising:
 at least one processor configured to implement:
  a candidate channel selector that
   selects a plurality of candidate channels from among a plurality of channels included in an available frequency band of the network, in response to a reception signal strength of the plurality of candidate channels being less than a threshold signal strength, and
   in response to a number of the plurality of candidate channels being less than a predetermined number of channels, increases the threshold signal strength and repeats the selection of the plurality of candidate channels until the number of the plurality of candidate channels is equal to the predetermined number of channels;
  a candidate channel classifier which classifies the plurality of candidate channels into a plurality of frequency regions by grouping adjacent two or more of the plurality of candidate channels into a same frequency regions of the plurality of frequency regions and arranging the adjacent two or more candidate channels of the same frequency region in order of frequency of the adjacent two or more candidate channels; and
  an target channel selector which selects at least one candidate channel as a hopping target channel from each of the plurality of frequency regions, wherein the at least one candidate channel selected from each of the plurality of frequency regions has a same relative position in the respective plurality of frequency regions,
 wherein the hopping target channels comprise two most frequency-distant channels selected from two neighboring frequency regions among the plurality of frequency regions.

* * * * *